United States Patent [19]

Salpaka

[11] Patent Number: 5,193,824
[45] Date of Patent: Mar. 16, 1993

[54] CHUCK HAVING A DRIVE BIT SOCKET
[75] Inventor: Glenn L. Salpaka, Salem, S.C.
[73] Assignee: Jacobs Chuck Technology Corp., Wilmington, Del.
[21] Appl. No.: 927,070
[22] Filed: Aug. 7, 1992
[51] Int. Cl.⁵ ............................................. B23B 31/12
[52] U.S. Cl. ...................................... 279/60; 279/144
[58] Field of Search ................................. 279/143–145, 279/158, 60–65; 408/239 A, 241 R

[56] References Cited
U.S. PATENT DOCUMENTS 4,874,181 10/1989 Hsu ....................................... 279/144
5,015,129 5/1991 Albin .............................. 408/239 A

FOREIGN PATENT DOCUMENTS 3338060 5/1985 Fed. Rep. of Germany ..... 279/1 A

Primary Examiner—Steven C. Bishop
Attorney, Agent, or Firm—G. Victor Treyz; Robert R. Jackson

[57] ABSTRACT

A chuck is provided that has a threaded axial bore so that the chuck may be mounted onto a threaded spindle. The chuck body has an integrally formed socket that accepts a drive bit so that the chuck may be screwed onto the spindle by inserting a drive bit into the socket and rotating the chuck accordingly.

21 Claims, 3 Drawing Sheets

CHUCK HAVING A DRIVE BIT SOCKET

BACKGROUND OF THE INVENTION

This invention relates to chucks, and particularly to mounting chucks on tools that have threaded spindles.

Tools are often provided with adjustable chucks which accept bits of various diameters. For instance, drilling machines have adjustable chucks that accommodated various sizes of drill bits. Likewise, milling machines, powered screw drivers, routers, and other powered tools have chucks for holding bits with different shank diameters. A chuck is typically mounted to a rotatable machine spindle by screwing the threaded chuck onto the spindle by hand and then tightening the chuck with a wrench. However, this type of hand assembly can be cumbersome, and since not all individuals tighten chucks to the same degree, there may be an undesirable variation in how firmly chucks are attached to the spindles. Further, a chuck may be damaged by gripping it with the wrench during mounting.

SUMMARY OF THE INVENTION

It is therefore an object of the present invention to provide an improved chuck that may be more easily mounted on a machine spindle.

It is a further object of the invention to provide a chuck that has an integral socket formed within the chuck body that is shaped to accept a corresponding mating driver, which may be powered by an automated tool.

These and other objects of the present invention are accomplished in accordance with the invention by providing a chuck having an axial socket formed in the chuck body. Since the threaded portion of the chuck is also integral with the body, the chuck can be mounted on a spindle by engaging the socket with an appropriate driver and rotating the driver by hand or with a powered tool. The socket can be formed in the shape of a slot for accepting a screw driver or similar type of blade or can alternatively be hexagonally shaped for accepting a hex-head screwdriver. The socket can also be formed in other industry-standard socket shapes, such as those of a spline socket or a cross recess socket. In a preferred embodiment, the chuck sockets are adapted to accept bits from the commonly used bit set sold under the trademark "TORX". Further features of the invention, its nature and various advantages will be more apparent from the following detailed description of the preferred embodiments and the accompanying drawings.

DETAILED DESCRIPTION OF THE PREFERRED EMBODIMENTS

A chuck is typically provided with a threaded bore so that it may be mounted on a threaded machine spindle. Generally, the chuck is screwed onto the spindle by hand and tightened with a wrench. Although this can be an acceptable method of attaching the chuck, it is relatively inefficient, and if not performed properly, may result in damage to the exterior of the chuck. Further, if the chuck becomes worn from use, or a machine is in need of repair, it may be necessary to remove the chuck from the spindle. When either mounting or removing the chuck, it would be desirable to be able to engage the chuck body more securely. In accordance with the present invention a chuck is provided that has a socket formed within the chuck body. The socket will accept a commonly available drive bit, which allows the chuck to be mounted to the machine spindle by hand or with an automated power tool without risk of damage to the exterior of the chuck. An automated tool may also have a torque limiting feature that prevents the driver from applying excessive torque to the chuck during attachment.

Figure 1:
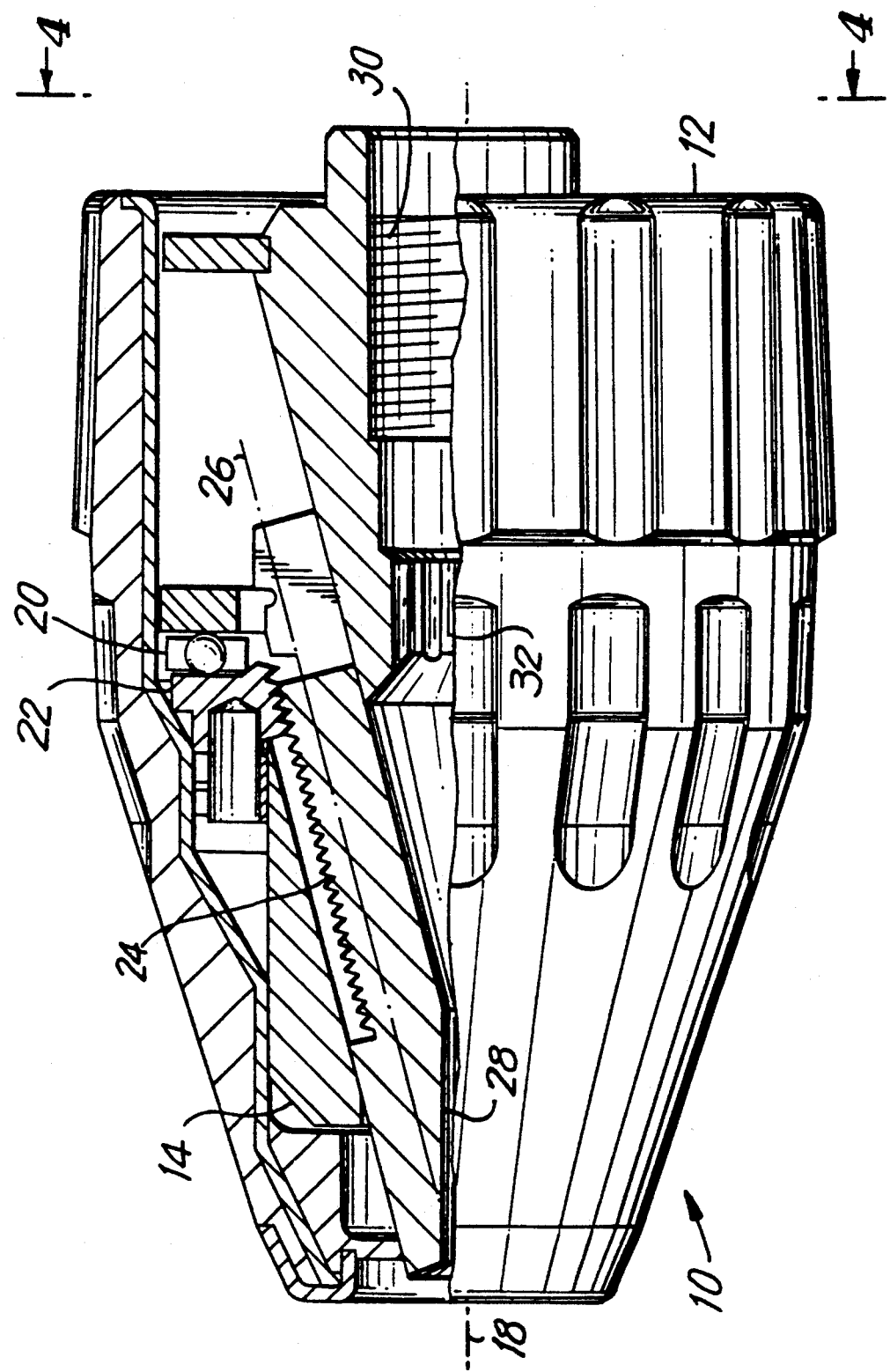
FIG. 1 is a longitudinal view, partially in section, of an illustrative embodiment of a chuck constructed according to the present invention.

An illustrative embodiment of a chuck constructed in accordance with the present invention are shown in FIG. 1. Chuck 10 has sleeve 12 that is attached to body 14. Sleeve 12 may be rotated about axis 18 on bearings 20. Nut 22 fits over three jaws such as jaw 24, which are mounted for reciprocal motion within bores in body 14. Typical jaw 24 reciprocates along axis 26. Nut 22 is attached to sleeve 12 so that when sleeve 12 is rotated about axis 18 the threads of nut 22 engage the jaw teeth, urging jaw 24 along axis 26. When it is desired to grip a bit, for instance, sleeve 12 is rotated so that inner surfaces 28 of the jaws grasp the shank of the bit. In order to change a bit or to accommodate a larger shank, sleeve 12 may be rotated in the opposite direction, thereby retracting the jaws.

Figure 2:
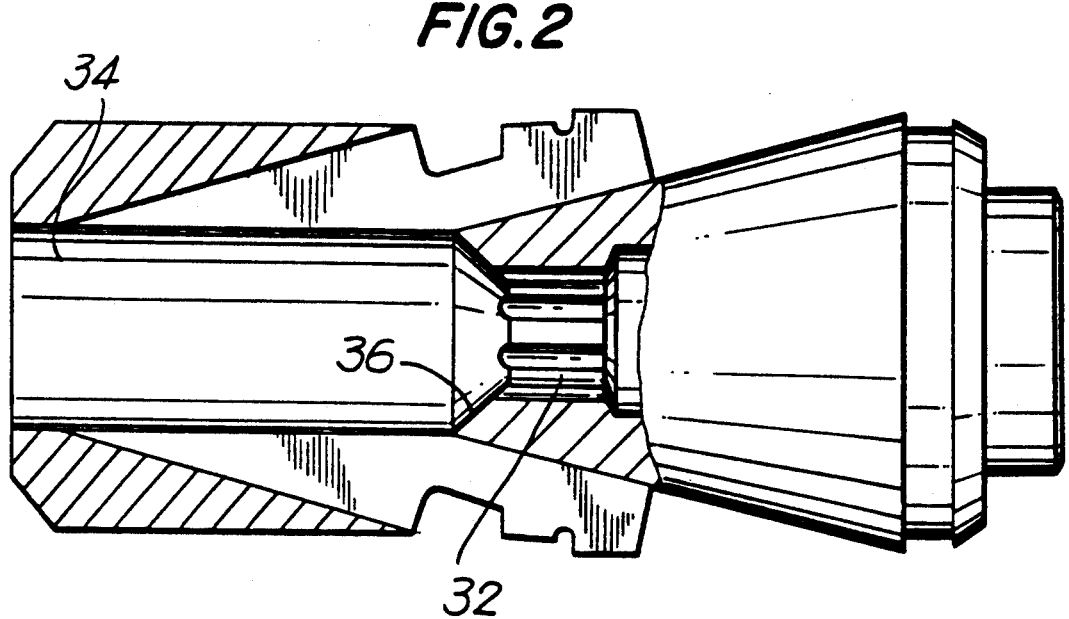
FIG. 2 is another longitudinal view, partially in section, of the illustrative chuck body of FIG. 1.
Figure 3:
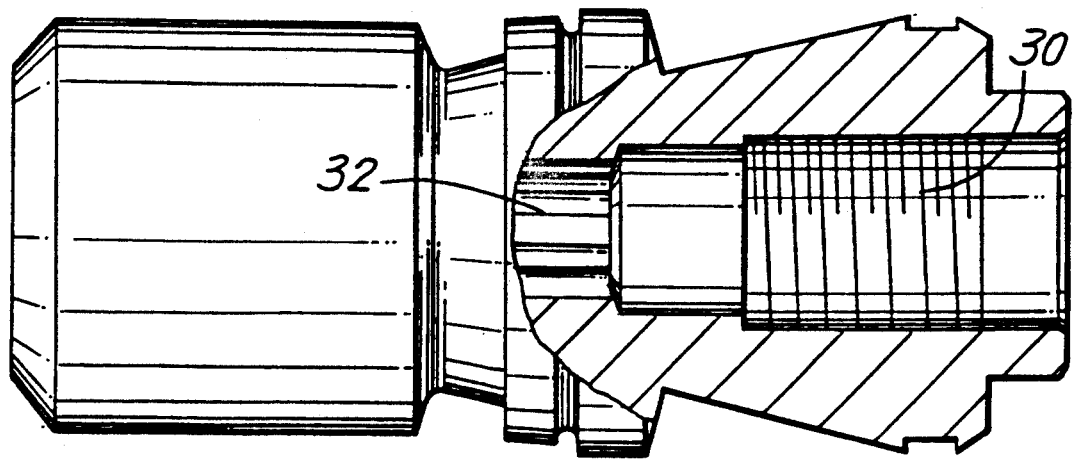
FIG. 3 is a view, partially in section, that is similar to FIG. 2.
Figure 4:
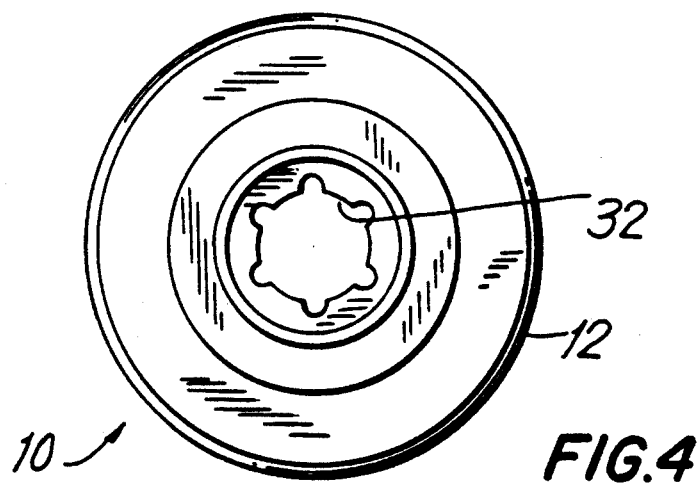
FIG. 4 is an axial view of the illustrative chuck taken along the line 4—4 in FIG. 1, showing a socket that is shaped to accept a bit sold under the trademark "TORX".

Chuck body 14 has threaded axial bore 30 for mounting chuck 10 on a threaded machine spindle (not shown). A conventional chuck could be tightened onto the spindle by grasping the sleeve with a wrench. In accordance with the present invention, chuck 10 is provided with socket 32 in body 14. Socket 32 extends axially between entrance bore 34 and threaded bore 30, as shown in FIGS. 2-4.

Figure 5:
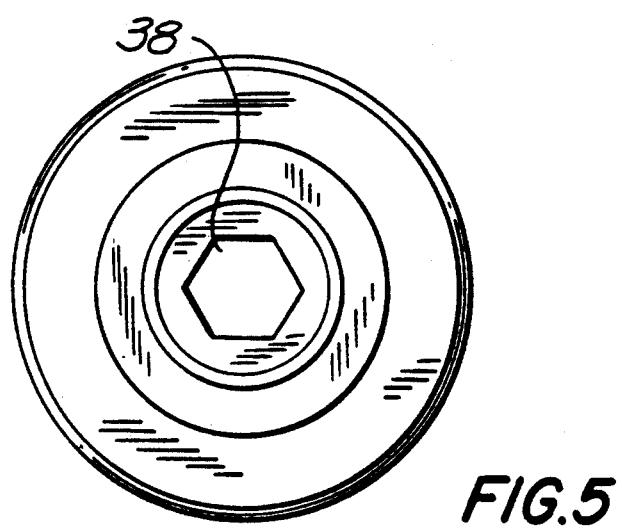
FIG. 5 is an axial view of another illustrative embodiment of a chuck constructed according to the invention in which the socket is hexagonally shaped.
Figure 6:
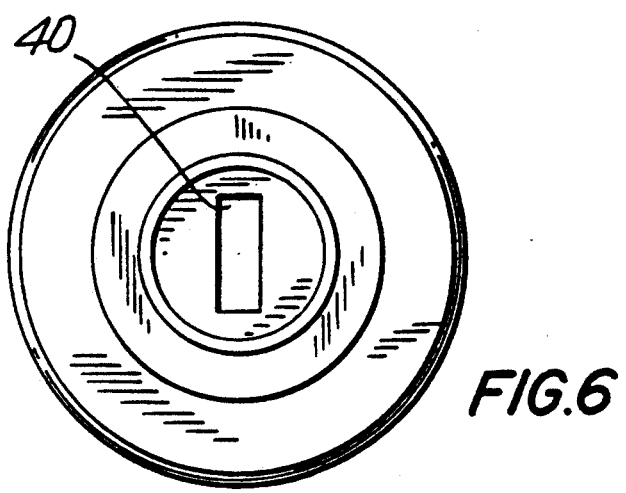
FIG. 6 is an axial view of a further illustrative embodiment of a chuck constructed according to the invention where the socket has been formed in a rectangular shape so that the chuck may be driven by a blade.

When it is desired to mount chuck 10 on a machine spindle, the jaws must be retracted sufficiently to allow an appropriate drive bit to be inserted into socket 32 via entrance bore 34. Axially symmetric surface 36 of body 14 aids in guiding the drive bit into socket 32 during insertion. Socket 32 is preferably shaped to accept a drive bit sold under the trademark "TORX", because these bits are often available to the users of power tools. The cross-sectional shape of these bits is substantially identical to the cross-sectional shape of socket 32 shown in FIG. 4. The cross-section is circular with smaller semi-circular portions evenly spaced around the periphery. A fastener having a similar cross-section is shown in Carlson U.S. Pat. No. 3,352,190. The sidewalls of socket 32 are substantially parallel to axis 18. Although this shape is preferred, it will be apparent to those skilled in the art that some departures from this scheme will still provide acceptable results for engaging the desired drive bits. For example, socket 32 may alternatively be hexagonally shaped for accepting a hex-head screw driver, as shown at 38 in FIG. 5, or rectangularly shaped for accepting a blade such as a screwdriver blade, as shown at 40 in FIG. 6. Socket 32 can also be formed in the shape of the American National Standard hexagon and spline sockets (ANSI B18.3-1976) shown on page 1210 of the Machinery's Handbook by Erik Oberg, Franklin D. Jones, and Holbrook L. Horton (Paul B. Schubert et al. eds., 21st ed., Industrial Press, Inc., New York, N.Y., 1980), which is incorporated herein by reference. Other possible socket shapes are the TYPE I, TYPE IA, and TYPE II cross recess shapes (ANSI B18.6.3-1972, R1977), shown on page 1186 of the same reference.

Although chuck 10 may be readily attached to a spindle using a powered drive bit inserted into socket 32, 38, 40, or the like, it is also advantageous to use such drive bits with unpowered hand tools, because a wrench is not required on the exterior of the chuck to tighten the chuck onto the spindle.

It will be apparent that the foregoing is merely illustrative of the principles of this invention, and that various modifications of this invention can be made by those skilled in the art without departing from the scope and spirit of the invention. For instance, it is not necessary that socket 32 extend completely from entrance bore 34 to threaded bore 30. Rather, socket 32 could be provided as a recessed portion extending partially into body 14 from entrance bore 34. The engaging function of female socket 32 could also be obtained by using a male shaped structure at the same general location at the end of entrance bore 34. Further, the threaded connection between the chuck and the spindle could alternatively employ a male shaft integral with the chuck body and a female spindle.

What is claimed is:

1. A chuck that is adapted to fit onto a threaded spindle, the chuck comprising a body having portions that define a threaded axial bore, portions that define an axial entrance bore, and portions defining an axial socket, the socket being adapted to accept a drive bit such that the drive bit may be rotated so as to engage the socket and rotate the chuck so that the threaded axial bore is screwed onto the threaded spindle.

2. The chuck defined in claim 1 wherein the socket extends axially from the entrance bore through the body to the threaded axial bore.

3. The chuck defined in claim 1 wherein the socket is shaped to accept a drive bit sold under the trademark "TORX".

4. The chuck defined in claim 1 wherein the socket has a hexagonal cross-section and side walls that are substantially parallel to the chuck longitudinal axis.

5. The chuck defined in claim 1 wherein the socket has a rectangular cross-section and sidewalls that are substantially parallel to the drill chuck longitudinal axis.

6. The chuck defined in claim 1 wherein the socket has a cross-sectional shape that is substantially circular with a plurality of substantially semi-circular portions evenly spaced around the periphery.

7. The chuck defined in claim 1 wherein the body has a surface disposed adjacent to the socket and adjacent to the entrance bore such that when the drive bit is inserted into the entrance bore the surface aids in guiding the drive bit into the socket.

8. A chuck body comprising portions that define a threaded axial bore that is adapted to be screwed onto a threaded spindle, portions that define an axial entrance bore, and portions that define an axial socket for accepting a power tool drive bit that may be rotated so as to engage the socket and rotate the chuck body so that the threaded axial bore engages the threaded spindle and the chuck body is screwed onto the threaded spindle, the axial socket extending through the body from the entrance bore to the threaded axial bore.

9. The chuck defined in claim 8 wherein the socket is shaped to accept a drive bit sold under the trademark "TORX".

10. The chuck defined in claim 8 wherein the socket has a hexagonal cross-section, the socket having sidewalls that are substantially parallel to the drill chuck longitudinal axis.

11. The chuck defined in claim 8 wherein the socket has rectangular cross-section, the socket having sidewalls that are substantially parallel to the chuck longitudinal axis.

12. The chuck defined in claim 8 wherein the socket has a cross-sectional shape that is substantially circular with a plurality of substantially semi-circular portions evenly spaced around the periphery.

13. The chuck defined in claim 8 wherein the body has an axially symmetric surface disposed adjacent to the socket and adjacent to the entrance bore such that when the power tool drive bit is inserted into the entrance bore the surface aids in guiding the drive bit toward the socket.

14. A chuck having a body member which is threadedly mountable on a spindle, said chuck having a tool-receiving recess which is axially aligned with said spindle, a portion of said body member being accessible via said recess, said portion of said body member being shaped to removably rotatably engage a driver tool inserted in said recess substantially parallel to the axis of said spindle so that said chuck can be threaded on or off said spindle by rotation of said driver tool about the axis of said spindle.

15. The chuck defined in claim 14 wherein said portion of said body member is shaped to engage with a driver tool bit sold under the trademark "TORX".

16. The chuck defined in claim 14 wherein said portion of said body member is shaped to engage with a driver tool having a hexagonal cross section.

17. The chuck defined in claim 14 wherein said portion of said body member is shaped to engage with a drive tool having a rectangular cross section.

18. The chuck defined in claim 14 wherein said portion of said main body member which is shaped to removably rotatably engage said driver tool is concentric with the axis of said spindle.

19. The chuck defined in claim 14 wherein said portion of said main body member which is shaped to removably rotatably engage said driver tool is recessed inwardly from said tool-receiving recess.

20. The chuck defined in claim 19 wherein said main body defines a spindle-receiving recess extending in the opposite direction from said tool-receiving recess.

21. The chuck defined in claim 20 wherein said portion of said main body member which is shaped to removably rotatably engage said driver tool is an aperture through said main body member between said tool-receiving recess and said spindle-receiving recess.

* * * * *